(12) United States Patent
Coskun et al.

(10) Patent No.: US 11,341,289 B2
(45) Date of Patent: May 24, 2022

(54) METHOD FOR REMODELING A COMPONENT

(71) Applicant: General Electric Company, Schenectady, NY (US)

(72) Inventors: Kemal Mehmet Coskun, Birr (CH); Yong Wu, Shanghai (CN)

(73) Assignee: General Electric Company, Schenectady, NY (US)

( * ) Notice: Subject to any disclaimer, the term of this patent is extended or adjusted under 35 U.S.C. 154(b) by 565 days.

(21) Appl. No.: 16/265,138

(22) Filed: Feb. 1, 2019

(65) Prior Publication Data

US 2019/0258748 A1 Aug. 22, 2019

(30) Foreign Application Priority Data

Feb. 22, 2018 (EP) .................................... 18158117

(51) Int. Cl.
*G06F 30/00* (2020.01)
*G05B 19/4099* (2006.01)
(Continued)

(52) U.S. Cl.
CPC ......... *G06F 30/00* (2020.01); *G05B 19/4099* (2013.01); *G06F 30/15* (2020.01); *G06F 2111/20* (2020.01); *G06F 2119/18* (2020.01)

(58) Field of Classification Search
CPC ...... G06F 30/00; G06F 30/15; G06F 2119/18; G06F 2111/20; G05B 19/4099
See application file for complete search history.

(56) References Cited

U.S. PATENT DOCUMENTS

2005/0114097 A1* 5/2005 Duncan .................. G06F 30/23
703/1
2008/0204454 A1* 8/2008 Laning .................... G06F 30/00
345/420
(Continued)

OTHER PUBLICATIONS

Hongying Yu & Xuegeng Lyu; "Repair of defective 3D blade model based on deformation of adjacent non-defective cross-sectional curve"; The International Journal of Advanced Manufacturing Technology (Year: 2017).*

(Continued)

*Primary Examiner* — Rehana Perveen
*Assistant Examiner* — Nupur Debnath
(74) *Attorney, Agent, or Firm* — Fletcher Yoder P.C.

(57) ABSTRACT

A method for modeling a refurbishing geometry of a component comprises removing a portion to be refurbished from the component, thereby obtaining a truncated component, with a cut surface and a boundary line of the cut surface. Image data of the truncated component are obtained and a representation of the image data is imported into a CAD system. A CAD model of the component, for instance in an unused and nominal new condition, is provided and aligning with the imported representation of the truncated component. Points are defined on the surface of the CAD model and arranged on rows. For each row, a point on the representation of the boundary line of the cut surface closest to the row is determined, and the points in each row are displaced in a translational displacement until the row intersects the representation of the boundary line, thereby obtaining a morphed CAD model representative of the refurbishing geometry of the component.

16 Claims, 3 Drawing Sheets

(51) Int. Cl.
*G06F 30/15* (2020.01)
*G06F 111/20* (2020.01)
*G06F 119/18* (2020.01)

(56) References Cited

U.S. PATENT DOCUMENTS

| | | |
|---|---|---|
| 2016/0121438 A1 | 5/2016 | Ladewig et al. |
| 2018/0339456 A1* | 11/2018 | Czinger ................ B29C 64/379 |
| 2018/0365371 A1* | 12/2018 | Urick ...................... G06F 30/20 |
| 2018/0374262 A1* | 12/2018 | Ezair .................. G05B 19/4099 |

OTHER PUBLICATIONS

BDE Manufacturing Technologies; "What are the Different Tool path Strategies for Optimizing CNC Machining?" https://www.bdeinc.com/blog/different-tool-path-strategies-optimizing-cnc-machining/ (Year: 2017).*

Yu Rong, Jinting Xu and Yuwen Sun; "A surface reconstruction strategy based on deformable template for repairing damaged turbine blades"; Aerospace Engineering; (Year: 2013).*

European Search Report issued in connection with corresponding EP patent application No. 18158117.4 dated Aug. 23, 2018.

H. Yu et al: "Repair of defective 3D blade model based on deformation of adjacent non-defective cross-sectional curve", The International Journal of Advanced Manufacturing Technology,vol. 95, No. 5, 2017, pp. 3045-3055, XP036439969,DOI: 10.1007/S00170-017-1393-8[retrieved on Dec. 5, 2017 section 4; sections 5-7; figures 3.7-10*.

* cited by examiner

METHOD FOR REMODELING A COMPONENT

TECHNICAL FIELD

The present disclosure relates to a method as set forth in the claims.

BACKGROUND OF THE DISCLOSURE

In many fields of technology it is desirable to refurbish worn components rather than scrapping them. In other instances, it may be desired to upgrade components in providing an upgraded geometry yielding improved characteristics in a section of a component. Refurbishing may be understood broadly, and may include providing the component with an upgraded geometry to exhibit improved performance rather than only slavishly reshaping an unused and nominal condition. An example is turboengine, for instance gas turbine engine, airfoils and blades. Those typically experience the strongest wear at the blade tip, while the overall profile may experience minor wear. One method of refurbishing the blades comprises cutting the tip of the blade and remodeling the physical tip. However, if remodeling is based upon nominal design data, the surface of the refurbished component may exhibit discontinuities and steps of the surface at the location where the truncated component and the remodeled tip section join each other. This may be the result of the minor wear of the truncated component which is also present in the remaining section, but may also be a result of manufacturing tolerances when the component was originally manufactured. These steps require post-processing of the component, or otherwise may yield a negative impact on the aerodynamic performance of a blade. It may thus be found desirable to provide a method for refurbishing a component, and in embodiments a worn component, in which the refurbishing geometry is modeled so as to require less or no post-processing.

Outline of the Subject Matter of the Present Disclosure

It is an object of the present disclosure to provide a method of the type initially mentioned. In a more specific aspect, the method shall be provided so as to model a refurbishing geometry of a component in which a transition between the remaining original component and a remodeled section is provided as smooth as possible, if possibly without any steps. In further, more specific aspects the method shall enable modeling the refurbishing geometry so as to achieve a near net shape manufacturing of the refurbished section.

This is achieved by the subject matter described in claim 1.

Further effects and advantages of the disclosed subject matter, whether explicitly mentioned or not, will become apparent in view of the disclosure provided below.

Accordingly, disclosed is a method for modeling a refurbishing geometry of a component, the method comprising locating a portion of the component which portion is intended to be refurbished, and removing the portion to be refurbished from the component, thereby obtaining a truncated component. In embodiments, the method is a method for modeling a refurbishing geometry of a worn component, the method comprising locating a damaged portion of the worn component and removing the damaged portion from the worn component, thereby obtaining a truncated component. As noted above, refurbishing shall not necessarily be understood as slavishly rebuilding or reshaping an original geometry as closely as possible, but may also include providing the refurbished component with an upgraded or otherwise modified geometry when compared to the component to be refurbished when it were in an original new and unused state. It is understood that the truncated component is a remainder of the original component with a region to be refurbished removed, and, in embodiments, the worn component with a region exhibiting damage or wear to an extent requiring repair action being removed. The truncated component comprises a cut surface. The cut surface exhibits a boundary line at which the cut surface meets a non-cut surface of the truncated component. The method further comprises obtaining image data of the truncated component, which image data comprise image data of at least one of the cut surface and the boundary line. It is understood that the boundary line encloses the cut surface and my thus be considered to implicitly represent also the cut surface. The image data may for one instance be obtained as 3-dimensional image data by a scan of the truncated component. In other instances the image data may be obtained as 2-dimensional image data in taking a photograph of the cut surface. It may generally be a reasonable assumption that the cut surface will in any image be clearly distinguishable from other surface areas of the truncated component. While the used and non-cut surface areas may appear matte, the cut surface may in instances exhibit a shiny metallic appearance. The transition between matte and shiny surface areas may then easily be identified as the boundary line of the cut surface. Subsequently, a representation of the image data it is imported into a CAD system, thereby importing a representation of at least an aspect of the truncated component into the CAD system. The skilled person will readily appreciate that importing a "representation" means importing data which enable the CAD system to build and display a virtual model of at least an aspect of the truncated component within the virtual space of the CAD system. It is in this respect clear that the image data may need to be prepared to fit the data format and fulfill other boundary conditions required by the CAD system. This may include in instances digitizing the image data and provide them in a format suitable for the specific CAD system used. Further, as the image data may in instances be 2-dimensional data, these data may not be representative of the entire truncated component, but may be representative of only an aspect of the truncated component covered by the 2-dimensional image data. The skilled person will further readily understand that referring to the representation of the truncated component, or simply the truncated component, within the framework of this document and in relation to a CAD system, this condensed term shall be understood as a representation of at least an aspect of the truncated component. The representation of the truncated component comprises at least representation of the boundary line of the cut surface, which in turn at least implicitly defines a representation of the cut surface being enclosed by the representation of the boundary line. A reference axis is defined in the CAD system, wherein a parallel to the reference axis permeates the representation of the cut surface. In particular embodiments, the reference axis may be defined perpendicular to the cut surface. The method further comprises providing a CAD model of the component. In certain instances, a CAD model of the component in an unused and nominal new condition may be provided. In other instances a CAD model of the component in a revised or otherwise modified version may be provided. This may be found beneficial to upgrade the component to a geometry yielding improved performance or otherwise provide a modified component which differs from the original shape. More generically, the CAD model to be provided may be referred to as a CAD model of the component in a state-to-be-achieved, i.e. in a geometry strived at for the refurbished component, which is intended for reuse. Further, the CAD model and the representation of the truncated component are aligned so as to achieve a general alignment of the representation of the truncated component and the CAD model. The latter may comprise aligning the CAD model and the representation of the truncated component so as to achieve a best fit. 3-dimensional image data sections of the CAD model corresponding to the truncated component may be brought into a best match relationship with the representation of the image data of the truncated component. If only 2-dimensional image data are available, a corresponding sectional view of the CAD model may be brought into a best match relationship with the representation of the cut surface or a boundary line of said sectional view may be brought into a best match relationship with the representation of the boundary line of the cut surface. It is noted that generally the geometry of the actual component will deviate from the ideal nominal geometry provided by the CAD model. As mentioned above, this may be due to manufacturing tolerances and/or due to wear of the component, or the formation of residues on the surface of the component, during the forgone operation of the component. Thus, the CAD model will not perfectly fit with the representation of the truncated component, or the boundary line of the cut surface, respectively. Methods and algorithms for achieving a best match are known in the art. Alternatively, the matching may be performed manually by a CAD operator. It is further understood that the skilled person will readily be aware of the possibilities to and know how to displace virtual representations of bodies or surfaces, be it the representation of the truncated component or the CAD model, in the virtual space of a CAD system. It is further understood that the reference axis is in a fixed relationship with the representation of the truncated component, so that any rotational movement of the representation of the truncated component in the CAD system will result in an identical rotational movement of the reference axis. The method further comprises defining points on the surface of the CAD model, the points being arranged on rows, wherein the rows are contour lines extending through a plane which is perpendicular to the reference axis. For each row, a point on the representation of the boundary line of the cut surface closest to the row is determined, and the data points in each row are displaced in a translational displacement, wherein the displacement is performed perpendicular to the representation of the boundary line at the point closest to the row, and continuing the displacement until the row intersects the representation of the boundary line. Thus, the CAD model is morphed to provide a continuous and virtually seamless refurbishing geometry extending from the representation of the cut surface, thereby obtaining a morphed CAD model. A section of the morphed CAD model extending from the representation of the cut surface is representative of a refurbished cut portion of the component and constitutes a model of the refurbished cut portion.

Again, it is understood that the component may be a worn component comprising a region which is damaged or worn to an extent requiring repair and thus refurbishing, but may also be generally a component in which a region is intended to be provided with an upgraded geometry, and thus said region is intended to be refurbished, as used in the context of the present disclosure.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

It is further presumed that the person having ordinary skill in the art is perfectly familiar with basic as well as advanced operations and functionalities of CAD systems, such as, while not being limited to, data import, displacement, rotation and scaling of geometries in the virtual space of a CAD system, defining points and attaching them to a virtual geometry in a CAD system, and so forth.

In specific embodiments, the reference axis may be defined such as to extend perpendicular to a plane in which the representation of the boundary line of the cut surface extends.

Removing the portion to be refurbished, and in embodiments the damaged portion, may comprise generating a planar cut surface In further, more specific, embodiments the points on the surface of the CAD model may be defined such that each row on which the points are located, in a projection onto a local tangent plane to the surface of the CAD model at the location where the row extends through the plane which is perpendicular to the reference axis, includes an identical angle with said plane which is perpendicular to the reference axis.

In other aspects, defining the points on the surface of the CAD model comprises attaching the points to the surface of the CAD model such that a displacement of a point causes a surface segment of the CAD model attached to the said point to locally move with the said point while the surface segment at the same time remains attached to the neighboring points. That is, upon displacement of one of said points the surface segments span up be said point and the neighboring points remain attached to all points and are skewed. The continuity of the model surface is maintained, and no steps or other discontinuities are generated.

In still further embodiments, defining the points on the surface of the CAD model comprises arranging the points on a grid on the surface of the CAD model, the grid consisting of layers extending on the surface of the CAD model in planes perpendicular to the reference axis, wherein each of the rows intersects each layer at a constant angle. In more particular embodiments this angle may be a 90° right angle.

Depending upon the functionality of the specific CAD system used, it may be found beneficial if defining the rows comprises forming a row as a spline through all points arranged on a line which cuts the layers at a constant angle with each layer. Likewise, it may in certain embodiments be found beneficial to approximate the image data by at least one spline and to import the resulting spline data into the CAD system.

As indicated above, obtaining image data of the truncated component may comprise obtaining 3-dimensional image data of the truncated component, for instance by scanning. Aligning the CAD model and the representation of the truncated component may then comprise matching the representation of the truncated component and a section of the CAD model corresponding to the representation of the truncated component. In other embodiments, however, obtaining image data of the truncated component may comprise obtaining 2-dimensional image data of the cut surface of the truncated component, for instance by a photograph. Aligning the CAD model and representation of the image data of the truncated component in these embodiments may comprise determining a position corresponding to the position of the cut surface on the CAD model, cutting the CAD model at said position, removing the section of the CAD model corresponding to the truncated component thus obtaining a cropped CAD model, matching the resulting crop surface of the cropped CAD model to the representation of the cut surface of the truncated component, and grafting the cropped CAD model to the representation of the cut surface. It is understood that the cut surface in this respect may be equivalently represented by a representation of the boundary line of the cut surface, which encloses the cut surface and thus implicitly defines the cut surface. Again, as the CAD model may not perfectly fit the representation of the truncated component, or of the cut surface, or of the boundary line, respectively, matching may, as outline above, comprise obtaining a best fit applying any method known to a person skilled in the art. Matching may in instances be performed manually by a CAD operator. Thus, the representation of the truncated component is complemented and a representation of a refurbishing geometry of the cut portion of the component is provided. Cutting the CAD model may be performed manually by a CAD operator.

Embodiments of the herein disclosed method may further comprise slicing the model of the refurbished cut portion and generating a toolpath, and/or processing the model of the refurbished cut portion for creating a CAM program suitable for machining the refurbished cut portion. The toolpath may for one instance be a laser cladding toolpath. It is understood that refurbishing the component and providing the refurbished cut portion may be performed in a machine tool, such as for instance, while not limited to, a laser cladding machine or a milling machine. Methods for refurbishing the cut portion may in particular include, while not being limited to, well known additive manufacturing methods, such as for instance, while not limited to, those known as Selective Laser Melting SLM or Electron Beam Melting EBM. The toolpath may for instances be a toolpath for the additive manufacturing method. In the context of the present application each instrumentation suitable to refurbish the component, which in embodiments is a worn component, including machines for performing additive manufacturing methods to build up a refurbished cut portion on the cut surface of the truncated component, will be subsumed under the term "machine tool" for the ease of nomenclature.

In further aspects, prior to obtaining the image data of the truncated component, the truncated component may be attached to a fixture which is intended for use in a machine tool for refurbishing the component, which in embodiments is a worn component. The image data may then be obtained with the truncated component attached to said fixture, wherein further the reference axis is referenced to the fixture. Hence, the orientation of the reference axis and the position of the truncated component in a later step are well-known with reference to the machine tool, which facilitates refurbishing the component, which in embodiments is a worn component, by the machine tool.

Further disclosed is a method for refurbishing a component, which in embodiments is a worn component, the method comprising modelling a refurbishing geometry of the component by the foregoing described method, providing the component to a machine tool, and refurbishing the component in operating the machine tool according to at least one of the generated toolpath and/or CAM program. The skilled person will readily appreciate that the method requires knowledge of the position of the cut surface of the truncated component and the orientation of the reference axis with respect to the machine tool. Thus, in a more specific embodiment, the method comprises modelling a refurbishing geometry of the component, which in embodiments is a worn component, wherein further the truncated component is attached to a fixture prior to obtaining the image data with the truncated component attached to said fixture. The reference axis is referenced to the fixture, and the fixture is mounted to the machine tool with the truncated component attached to the fixture. In particular, the position of the cut surface may also be referenced to the fixture. Thus, when the fixture is mounted to the machine tool, the orientation of the reference axis in relation to the coordinate system of the machine tool is known, and the position of the cut surface in the coordinate system of the machine tool may be known. In further embodiments the fixture may define a reference axis and a coordinate system referenced to the fixture, which is used as a coordinate system in defining the refurbishing geometry and in defining the toolpath and/or CAM program.

It is understood that the features and embodiments disclosed above may be combined with each other. In particular, it is understood that not necessarily all method steps need to be performed in the order in which they appear in the claims, unless they only make technical sense in said order. The skilled person will readily be able to determine which steps need to be performed in a specific order and for which steps the order in which they are carried out may be different than the appearance in the claims. It will moreover be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 an exemplary embodiment of representations of a cut surface and the boundary line of the cut surface of a truncated component within a CAD system, and a reference axis defined in relation to these representations.

Figure 1:
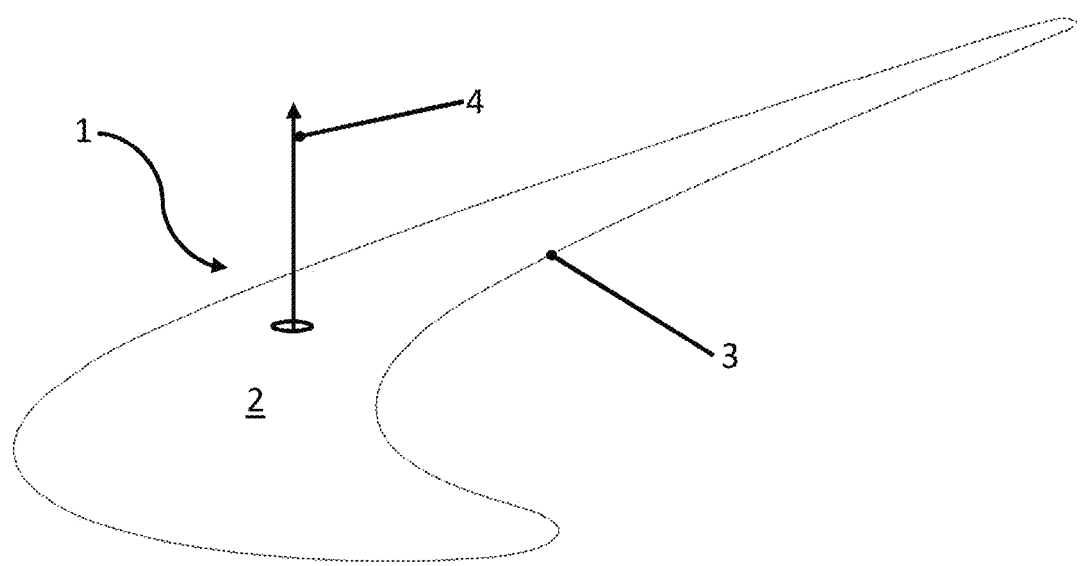

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

For the sake of a facilitated understanding of the herein disclosed subject matter, the method shall be explained in more detail by means of the easily appreciated exemplary embodiment of the refurbishment of the tip of the turbine blade. It is emphasized that this is only an exemplary embodiment of a specific mode of carrying out the herein disclosed method, and the method as claimed may be carried out in a different manner subsumed under the independent claim, and with different components to be refurbished.

As noted above, refurbishing shall not necessarily be understood as slavishly rebuilding or reshaping an original geometry as closely as possible, but may also include providing the refurbished component with an upgraded or otherwise modified geometry when compared to the component to be refurbished when it were in an original new and unused state.

By way of example the method is accordingly used to refurbish a worn turbine blade. As is familiar to the person skilled in the art, such blades may experience significant wear in the tip region, for instance due to occasional rubbing, but also due to the comparatively large contact surface with hot combustion gases. Other sections of the blade may also be subject to wear. For instance, the surfaces of the leading edge, the trailing edge, suction side and pressure side may be slightly eroded, or residues may be deposited on said surfaces. In addition, when the blade had been originally manufactured, it may already have been slightly deviating from the ideal nominal state due to manufacturing tolerances, and so forth. Summarizing, it will be appreciated that the geometry of the blade after having been in service for several thousand hours of operation will not perfectly fit the nominal geometry of a CAD model of the blade as to be remodeled. However, these traces of usage may be found to be sufficiently minimal so that the impact on the performance of the blade may be neglected or does in any case not economically justify scrapping the blade or refurbishing the entire blade. However, as noted, the blade tip, or airfoil tip, respectively, may require refurbishment. In a manner generally known to the person having skill in the art, a tip section is removed from the blade, for instance by cutting, milling, or any other suitable method. The tip section can then be rebuilt onto the truncated blade, for instance by laser cladding, or additive manufacturing methods similar to 3D printing, such as for instance, while not being limited to, those known as Selective Laser Melting (SLM) or Electron Beam Melting (EBM). Or, a replacement tip section may be welded or otherwise suitably connected to the cutting surface of the truncated blade. Again, those measures are merely mentioned by way of example and shall not be considered as limiting the claimed subject matter. Other suitable methods may be applied to rebuild the tip section. However, as the skilled person will readily appreciate, if the tip section is rebuilt according to the nominal geometry of a CAD model, there will almost for certain a step or other discontinuity be present at the transition between the truncated component and the rebuilt tip section. Again it is noted that a CAD model of the component in an unused and nominal new condition may be provided. In other instances, a CAD model of the component in a revised or otherwise modified version may be provided, which may be found beneficial to upgrade the component to a geometry yielding improved performance or otherwise provide a modified component which differs from the original shape. The imperfect fit noted above appears due to the fact that, for the reasons outlined above, the actual cross-sectional geometry of the truncated component will not perfectly coincide with the ideal and nominal geometry of the CAD model. These steps or discontinuities may yield an unwanted effect on the aerodynamic performance of the blade, and thus require reworking of the blade after the tip section has been rebuilt. This adds time and cost to the refurbishment process.

Thus, the present disclosure proposes a method in which the refurbishing geometry of the blade, or of the tip section, respectively may be modeled so as to minimize or even avoid rework of the rebuilt cut portion of the component, by a near-net-shape rebuilding process. In other aspects, the refurbishing geometry obtained in applying the herein described method may considerably facilitate any potentially required rework.

According to the presently disclosed method, following removing the damaged tip portion of the blade, image data of the truncated blade are obtained. In the present exemplary embodiment, two-dimensional image data are obtained in taking a photograph of the cut surface of the truncated blade. It may generally be assumed that the surface of the component, after several thousand hours of operation, will appear matte and comparatively dark, while the cut surface will appear shiny and bright. It is thus particularly easy to distinguish the cut surface from the used surface of the truncated component and to identify the boundary line at which the cut surface meets the non-cut, used, surface of the truncated component.

Figure 2:
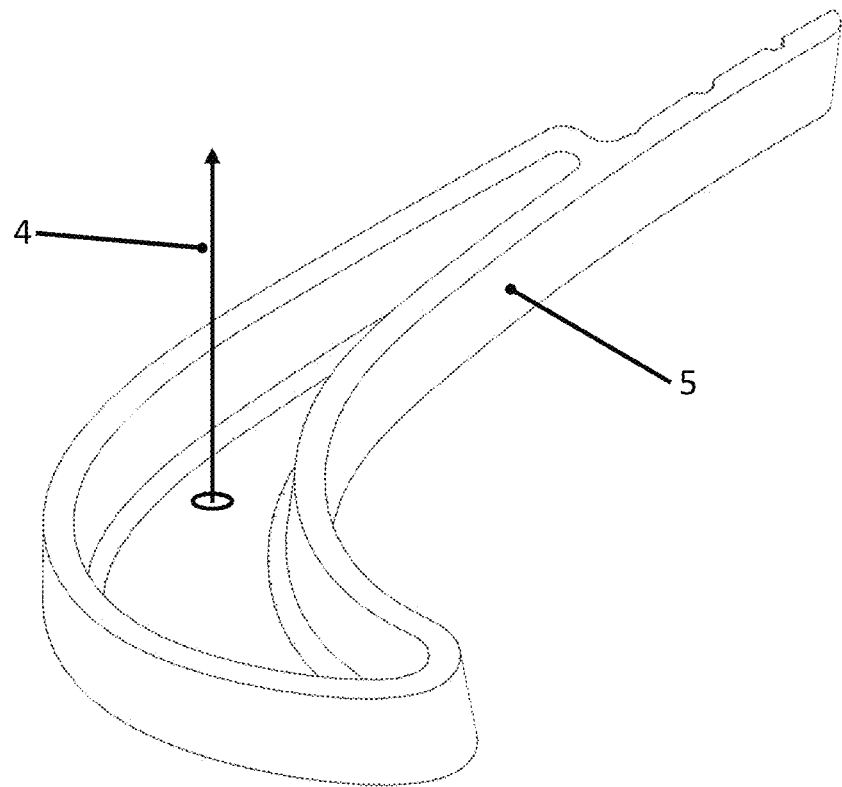
FIG. 2 an exemplary cropped CAD model of the component as to be rebuilt along with the reference axis.
Figure 3:
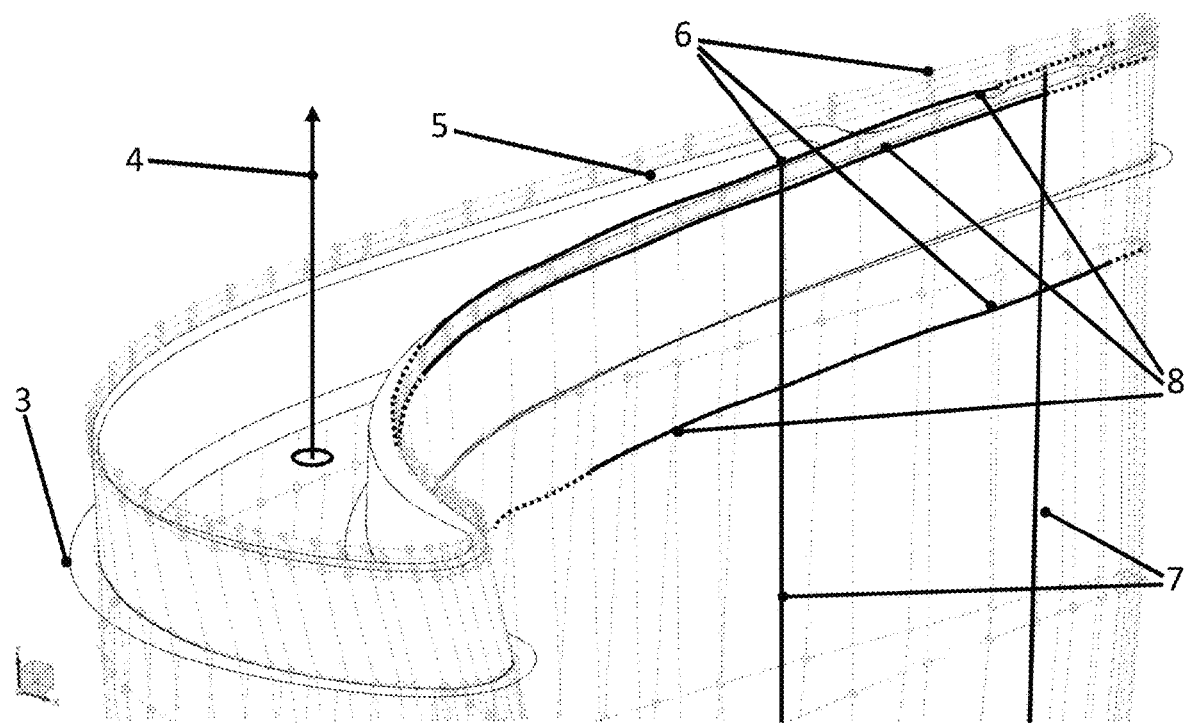
FIG. 3 the cropped CAD model matched with the representation of the cut surface, and points, layers and rows defined on the surface of the CAD model.
Figure 4:
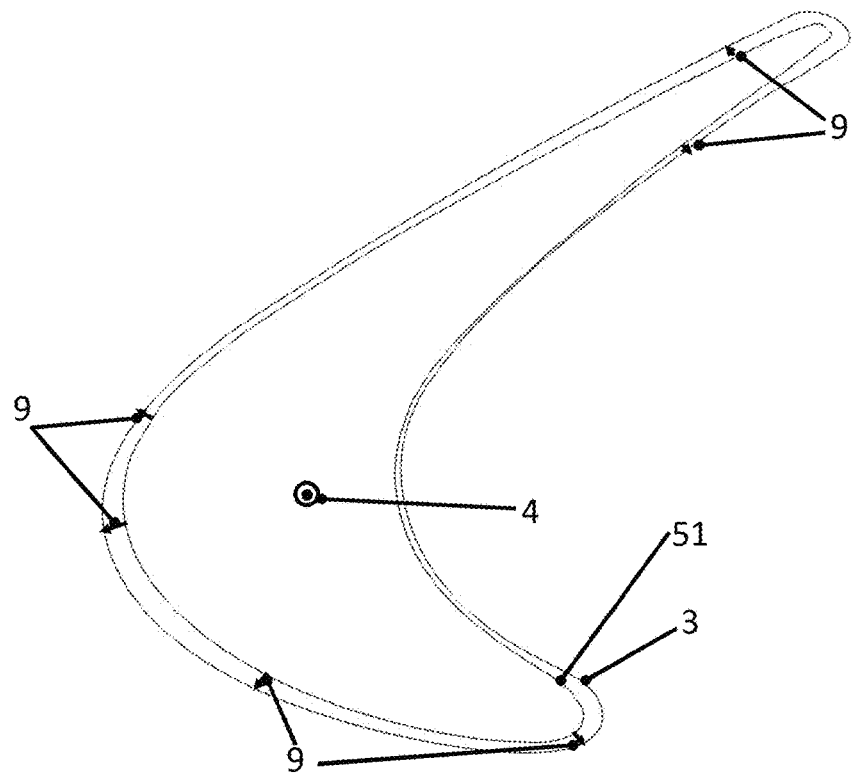
FIG. 4 a top view onto a superposition of the representation of the boundary line of the cut surface of the truncated component and a boundary line of the crop surface of the cropped CAD model.

For a subsequent step of the exemplary mode of carrying out the herein disclosed method reference is made to FIG. 1. A representation 1 of the image data is imported into a CAD system, and by way of example the boundary line 3 is approximated by a spline, if spline data are suitable for the specific CAD system used. Within the CAD system a representation 2 of the cut surface is provided, which is circumscribed by a representation 3 of the boundary line. A reference axis 4 is defined permeating the representation 2 of the cut surface. In particular, reference axis 4 is defined perpendicular to the cut surface, which, in this embodiment, is a plain cut surface. In a next step, a CAD model of the blade in a state-to-be-achieved is provided. The CAD model is cut at a position corresponding to the cut surface of the CAD model, and the section of the CAD model corresponding to the truncated component is removed from the CAD model. Thus, with reference to FIG. 2, a cropped CAD model 5 is obtained and is correspondingly aligned with respect to the reference axis 4. As illustrated in FIG. 3, the resulting crop surface of the cropped CAD model is matched with the representation of the cut surface of the truncated component. As becomes apparent by virtue of a joint consideration of FIGS. 3 and 4, the cropped CAD model does not perfectly fit the presentation of the cut surface, and thus, as is particularly apparent in FIG. 4, a boundary line 51 of the crop surface of the cropped CAD model does not perfectly coincide with the representation 3 of the boundary line. Reference is again made to FIG. 3. Points 6 are defined on the outer surface of the CAD model. These points are defined so as to be located on the intersections or nodes of so-called layers 8, which are lines extending on the outer surface of the CAD model and in planes perpendicular to the reference axis 4, and so-called rows 7, which are lines extending on the outer surface of the CAD model and which intersect the layers at constant, and in particular right, angles. The points are attached to the CAD model such that a surface segment span up by a multitude of the points displaces with a point upon displacement of the point, while remaining attached to the other points of the surface segment. Thus, upon displacement of any single point the continuity of the surface of the CAD model is maintained, while any surface segments attached to that point are skewed. Hence, by displacement of single or multiple points attached to the CAD model a morphed CAD model with a continuous surface is generated.

Referring again to FIG. 4, which shows a plain view onto the matched representation 3 of the boundary line of the cut surface of the truncated component and boundary line 51 of the crop surface of the cropped CAD model, it is outlined how the CAD model is morphed in order to model a geometry representative of a refurbished tip section of the blade. For each row, a point on the representation 3 of the boundary line is determined which is closest to the row. Subsequently, all data points in the row, or, in another point of view, the entire row, are displaced in a linear parallel displacement perpendicular to the representation of the boundary line at the point closest to the row. This displacement is performed iteratively until the row intersects the representation of the boundary line. The displacement of selected rows, or the data points on those selected rows, respectively, is indicated by arrows 9. As the points are attached to the surface of the CAD model, the surface is skewed and moved with the points, while a continuous surface of the CAD model is maintained. In a further aspect, the displacement may be performed along a trajectory which is perpendicular to both the representation of the boundary line at the point closest to the row and the reference axis 4. It will readily be appreciated by virtue of FIG. 4 that, after this displacement has been performed for all rows, the morphed CAD model will be shaped such that the boundary line of the crop surface of the cropped CAD model will, within reasonable tolerances, coincide with the representation 3 of the boundary line of the truncated component. The skilled person will further appreciate that the quality and accuracy of the fit will depend on the number of rows defined on the surface of the CAD model. The skilled person will further be perfectly able to make a reasonable estimation about the required accuracy, or the acceptable tolerances, and will thus be able to determine the number of rows and the number of points to be defined on the surface of the CAD model.

Figure 5:
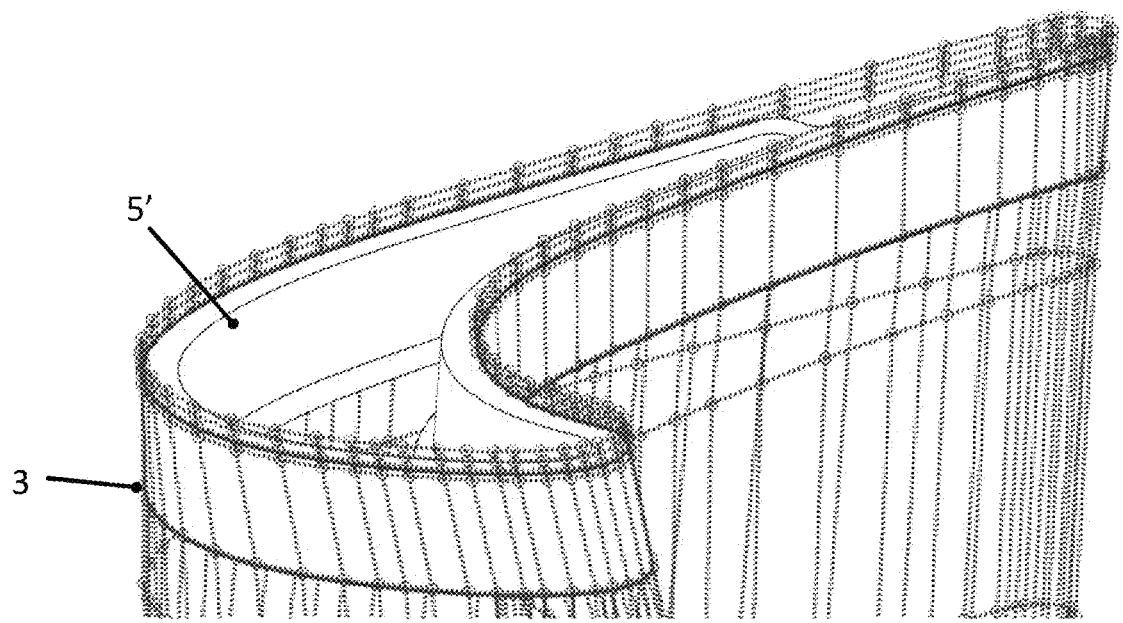
FIG. 5 the morphed CAD model fitting the representation of the cut component.
Figure 6:
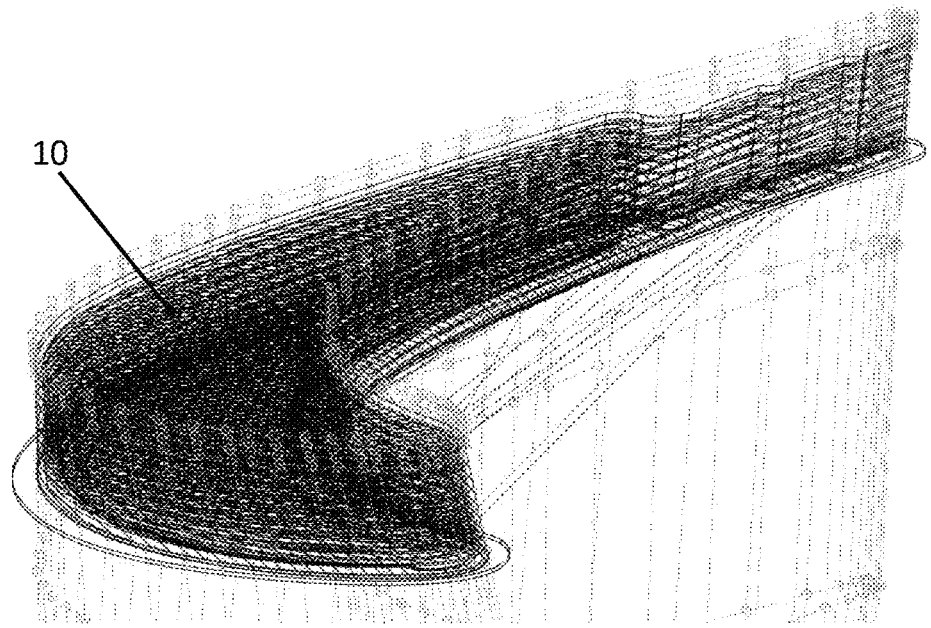
FIG. 6 the generation of a toolpath based upon the geometry of the morphed CAD model.

FIG. 5 shows the morphed cropped CAD model 5', which fits the representation of the cut surface of the truncated component, which is indicated in that the morphed cropped CAD model 5' is flush with the representation 3 of the boundary line of the cut surface. As illustrated in FIG. 6, based upon the morphed cropped CAD model, which represents a refurbishing geometry of the blade, for instance a laser cladding toolpath may be generated which enables to manufacture the refurbished tip section of the blade as a near net shape entity. In other embodiments, toolpath or CAM data for other methods for manufacturing the refurbished tip section and/or reworking the geometry of an otherwise refurbished blade may be generated. In instances, the blade may be attached to a fixture before obtaining the image data. The geometry of the blade, in particular the position of the cut surface, as well as the reference axis may be referenced to the fixture. The fixture may define a coordinate system to which all operations carried out in the CAD system may be referenced. The fixture with the truncated component firmly attached thereto may then be attached to a machining tool in which the operations according to the toolpath or CAM data obtained from the morphed CAD model are carried out. In this case, all geometry data are referenced to one unique coordinate system, be it in obtaining the image data, in performing the operations in the CAD system, and in the machine tool. As will be readily appreciated, this specific mode of performing the herein described method may yield a superior accuracy, as no transformation of geometry data and no re-referencing of the cut surface in the machine tool is required.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. A method for modeling a refurbishing geometry of a component, the method comprising
    locating a portion of the component which portion is intended to be refurbished,
    physically removing the portion to be refurbished from the component, thereby obtaining a truncated physical component, the truncated physical component comprising a cut surface, the cut surface having a boundary line at which the cut surface meets a non-cut surface of the truncated physical component,
    obtaining image data of the truncated physical component, the image data comprising image data of at least one of the cut surface and the boundary line,
    importing a representation of the image data into a CAD system, thereby importing a virtual representation of at least an aspect of the truncated physical component into the CAD system, whereby said virtual representation of the at least an aspect of the truncated physical component comprises at least a representation of the boundary line with a representation of the cut surface being enclosed by the representation of the boundary line,
    defining a reference axis in the CAD system, wherein a parallel to the reference axis permeates the representation of the cut surface,
    providing a CAD model of the component,
    aligning the CAD model and the virtual representation of the at least an aspect of the truncated component so as to achieve a general alignment of the virtual representation of the at least an aspect of the truncated physical component and the CAD model,
    defining points on the surface of the CAD model, the points being arranged on rows, wherein the rows are contour lines extending through a plane which plane extends perpendicular to the reference axis,
    for each row, determining a point on the representation of the boundary line of the cut surface closest to the row, and
    displacing the points in each row in a translational displacement, wherein the displacement is performed perpendicular to the representation of the boundary line at the point closest to the row, the method further comprises continuing the displacement until the row intersects the representation of the boundary line, thereby obtaining a morphed CAD model, wherein a section of the morphed CAD model extending from the representation of the cut surface is representative of a refurbished cut portion of the component and constitutes a model of the refurbished cut portion.

2. The method according to claim 1, wherein the reference axis extends perpendicular to a plane in which the representation of the boundary line of the cut surface extends.

3. The method according to claim 1, wherein removing the portion to be refurbished comprises generating a planar cut surface.

4. The method according to claim 1, wherein each row, in a projection onto a local tangential in plane to the surface of the CAD model at the location where the row extends through a plane which is perpendicular to the reference axis, includes an identical angle with the plane which is perpendicular to the reference axis.

5. The method according to claim 1, wherein defining the points on the surface of the CAD model comprises attaching the points to the surface of the CAD model such that a displacement of a point causes a surface segment of the CAD model attached to said point to move with the said point while the surface segment at the same time remains attached to the neighboring points, so that the surface is accordingly skewed when individual points attached to the surface segment are displaced.

6. The method according to claim 5, wherein defining the points on the surface of the CAD model comprises arranging the points on a grid on the surface of the CAD model, the grid consisting of layers extending on the surface of the CAD model in planes perpendicular to the reference axis wherein each of the rows intersects each layer at a constant angle.

7. The method according to claim 6, wherein each of the rows intersects each layer at a right angle.

8. The method according to claim 1, wherein defining the rows comprises forming a row as a spline through all points arranged on a line which intersects the layers at a constant angle with each layer.

9. The method according to claim 1, characterized in that importing a representation of the image data into a CAD system comprises approximating the image data by at least one spline and importing the resulting spline data.

10. The method according to any claim 1, wherein obtaining image data of the truncated physical component comprises obtaining 3-dimensional image data of the truncated physical component, and aligning the CAD model and the representation of the truncated physical component comprises matching the representation of the truncated physical component and a section of the CAD model corresponding to the representation of the truncated physical component.

11. The method according to claim 1, wherein obtaining image data of the truncated physical component comprises obtaining 2-dimensional image data of the cut surface of the truncated physical component, and aligning the CAD model and representation of the image data of the truncated physical component comprises determining a position corresponding to the position of the cut surface on the CAD model, cutting the CAD model at said position, removing the section of the CAD model corresponding to the truncated physical component thus obtaining a cropped CAD model, matching the resulting crop surface of the cropped CAD model to the representation of at least one of the cut surface of the truncated physical component and the boundary line of the cut surface, and grafting the cropped CAD model to the representation of the at least one of the cut surface and the boundary line, thus complementing the representation of the truncated physical component and providing a representation of a refurbishing geometry of the cut portion of the component.

12. The method according to claim 1, comprising at least one of slicing the model of the refurbished cut portion and generating a toolpath and/or processing the model of the refurbished cut portion for creating a CAM program suitable for machining the refurbished cut portion.

13. The method according to claim 1, wherein obtaining the image data of the truncated physical component comprises attaching the truncated physical component to a fixture which is intended for use in a machine tool for refurbishing the component prior to obtaining the image data, and obtaining the image data with the truncated physical component attached to said fixture, wherein further the reference axis is referenced to the fixture.

14. A method for refurbishing a component, the method comprising modelling a refurbishing geometry of the component by the method of claim 13, providing the component to a machine tool, and refurbishing the component in operating the machine tool according to at least one of the generated toolpath and/or CAM program.

15. The method according to claim 14, comprising modelling a refurbishing geometry of the component and further comprising attaching the truncated component to a fixture, obtaining the image data with the truncated component attached to said fixture, wherein further the reference axis is referenced to the fixture, and mounting the fixture to the machine tool with the truncated component attached to the fixture.

16. A method, comprising:
physically removing, via cutting, a portion from a worn component to create a truncated physical component;
obtaining image data of the truncated physical component, the image data comprising a cut surface having a boundary line where the portion was cut from the worn component;
applying a first CAD model that includes a virtual representation of the worn component when new to create a virtual representation of the worn component when new, the virtual representation;
deriving a virtual boundary line in the first CAD model, the virtual boundary line representative of the boundary line;
finding a surface on the virtual representation that permeates the virtual representation;
defining a reference axis in a CAD system that is parallel to the surface;
defining points on the surface of the first CAD model, the points being arranged on rows, wherein the rows comprise contour lines extending through a plane that extends perpendicular to the reference axis;
for each row, determining a point on the virtual boundary line,
displacing the points in each row via a translational displacement, wherein the translational displacement is performed perpendicular to the virtual boundary line at the point closest to the row; and
continuing the translational displacement until the row intersects the virtual boundary line, thereby obtaining a second CAD model, wherein a section of the second CAD model extending from a virtual representation of the cut surface is representative of a refurbished cut portion of the worn component and constitutes a model of the refurbished cut portion.

* * * * *